March 13, 1962 — L. T. SKEGGS — 3,024,692
CHART READERS AND COMPARATORS AND METHOD OF TRANSLATING
LIGHT TRANSMITTANCE VALUES OF COLORIMETER
RECORDINGS INTO CONCENTRATION VALUES Filed June 12, 1958 — 2 Sheets-Sheet 1

INVENTOR.
Leonard T. Skeggs
BY Eden Jensen &
Harry Cohen
ATTORNEYS

March 13, 1962  L. T. SKEGGS  3,024,692
CHART READERS AND COMPARATORS AND METHOD OF TRANSLATING
LIGHT TRANSMITTANCE VALUES OF COLORIMETER
RECORDINGS INTO CONCENTRATION VALUES
Filed June 12, 1958  2 Sheets-Sheet 2
FIG. 4
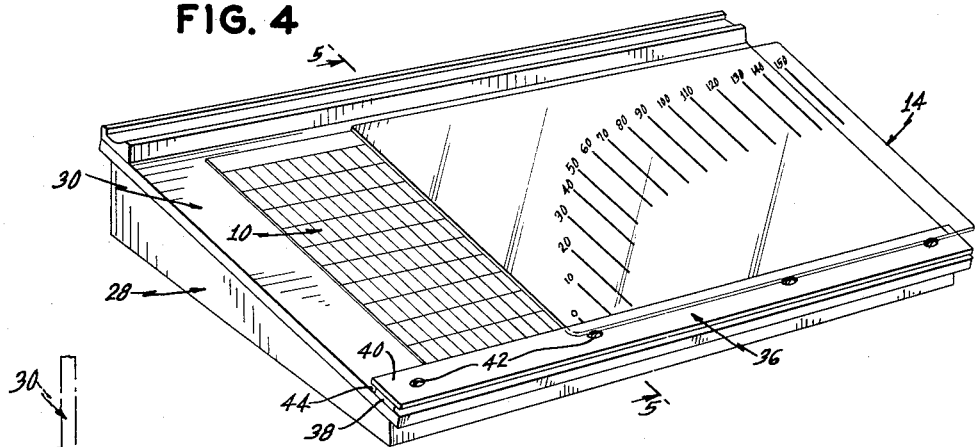
FIG. 5
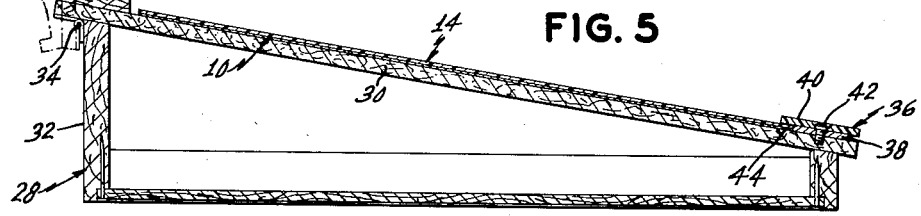
FIG. 6
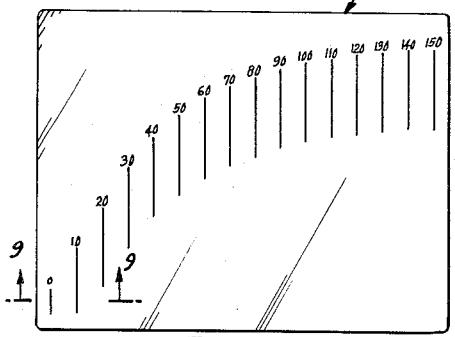
FIG. 7
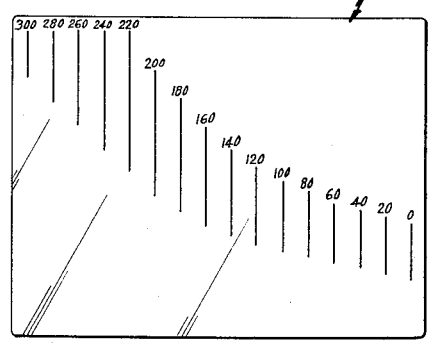
FIG. 8
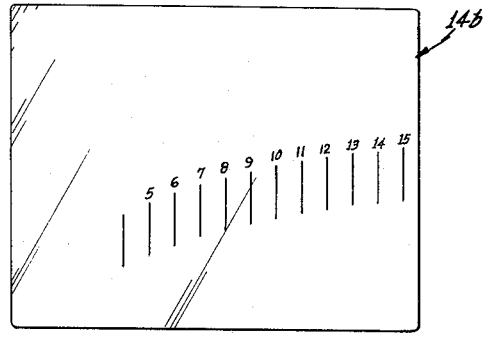
FIG. 9
INVENTOR.
Leonard T. Skeggs
BY
ATTORNEYS

United States Patent Office 3,024,692
Patented Mar. 13, 1962

3,024,692
CHART READERS AND COMPARATORS AND METHOD OF TRANSLATING LIGHT TRANSMITTANCE VALUES OF COLORIMETER RECORDINGS INTO CONCENTRATION VALUES
Leonard T. Skeggs, Cleveland, Ohio, assignor to Technicon Instruments Corporation, Chauncey, N.Y., a corporation of New York
Filed June 12, 1958, Ser. No. 741,533
6 Claims. (Cl. 88—14)

This invention relates to chart readers and comparators.

Recordings or charts having traces or curves formed in a recorder operable under the control of a colorimeter for indicating concentrations of various substances in various liquids subjected for that purpose to colorimetric examination are non-linear. This non-linear relation is due to the fact that in accordance with Beer's law, concentration of a substance in a liquid subjected to colorimetric examination varies with the logarithm of the light transmittance to which the photo-electric cell of the colorimeter or colorimeter-recorder is responsive. Because of the non-linear relation of the recordings of variout concentrations, accurate reading of the tracings on the chart is ordinarily difficult or, in spite of the exercise of great care, readings thought to be accurate may be unreliable.

For the above and other reasons, it has been proposed to provide colorimeter-recorders which are operable to produce a linear recording of substances of various concentrations in the liquids, as disclosed for example, in the United States application of Milton H. Pelavin, Serial No. 664,352, filed June 7, 1957 for Means for Providing a Linear Recording of Measurements or Values Which Vary in a Non-Linear Manner. Linearized recorders according to said invention of Milton H. Pelavin are highly desirable as they enable permanent records to be provided and also have other advantages in that they enable counters to be operated for providing direct readings of concentrations and also enable printed recordings of numerical values of the concentration, as indicated by the counters, to be readily provided. However, linearized recorders are rather expensive, and yet at least some of the results which could heretofore be obtained only with the use of linearized recorders are highly desirable and in many cases necessary, especially in respect to the provisions for obtaining accurate readings of the recording or chart.

The present invention, therefore, has for its primary object, the provision of means to facilitate the reading of a chart of the type referred to above and to enable accurate readings of charts provided in the operation of colorimeter-recorders.

The above and other objects, features and advantages of this invention will be fully understood from the following description considered in connection with the accompanying drawings, which are illustrative of the presently preferred mode of practicing this invention.

In the drawings:

FIG. 4 is a perspective view of the chart reader and comparator illustrated in FIG. 1;

FIG. 5 is a sectional view on the line 5—5 of FIG. 4;

FIGS. 6, 7 and 8 are plan views of comparators provided with scale markings thereon corresponding, respectively, to a band of curvatures for calibration curves of substances in the liquids under colorimetric examination; and FIG. 9 is a sectional view on the line 9—9 of FIG. 6, showing portions of the component layers of the comparator spread apart for illustrative purposes in describing the construction of the comparator.

Figure 1:
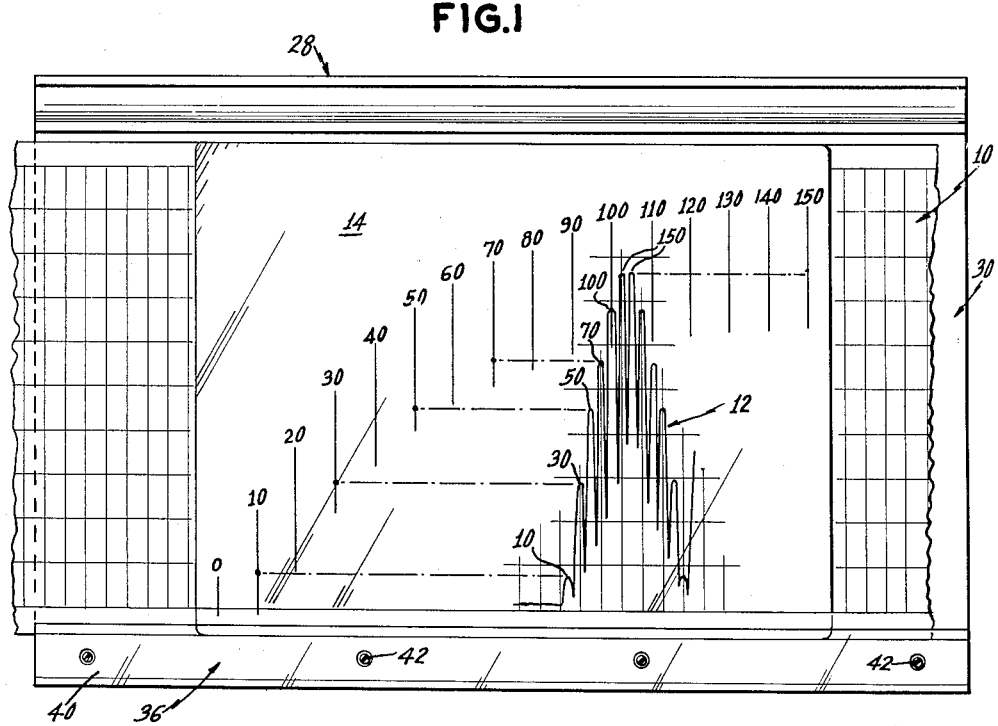
FIG. 1 is a top plan view of a chart reader and comparator pursuant to the present invention.
Figure 2:
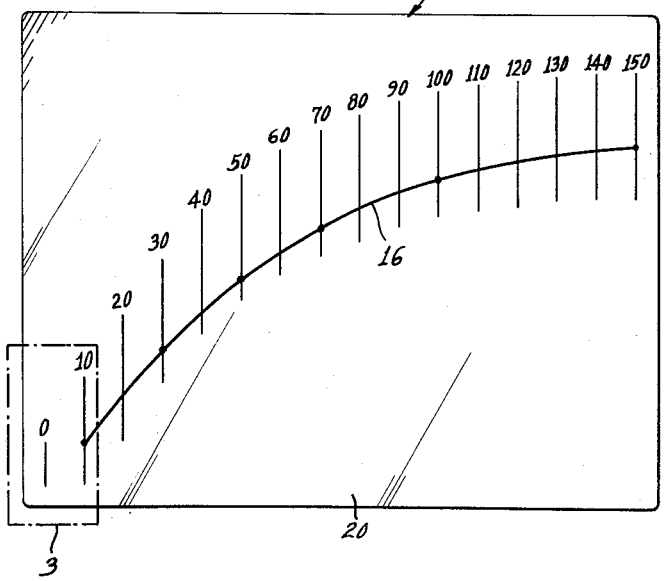
FIG. 2 is a plan view of a comparator of the present invention.

Referring now to the drawings in detail, a part of a chart produced on the colorimeter-recorder (not shown) is indicated at 10 in FIGS. 1, 4 and 5. As is well known, chart 10 is in the form of a paper strip, and in this case is semi-log chart paper. In FIG. 1 there is shown a recording 12 on chart paper 10 produced as a result of the operation of the colorimeter-recorder with a plurality of liquids of known concentrations therein, respectively, of the same substance, and a comparator plate 14 is shown in position over the chart paper 10 for manipulation, as hereinafter more particularly described, for providing a calibration curve indicated at 16 in FIG. 2. For purposes of illustration, it may be stated that the recording 12 (FIG. 1) and the calibration curve 16 (FIG. 2) correspond to the concentrations of urea nitrogen in a series of blood samples of known concentrations of the urea nitrogen therein, respectively. Comparator plate 14 illustrated in FIGS. 1 to 6 is structurally the same as the comparator plates 14a and 14b illustrated by FIGS. 7 and 8, except that the scale markings on the three plates, selected for illustrating the present invention, are arranged differently to conform, in general, to the shapes of the calibration curves for other substances. For example, blood glucose in the case of comparator plate 14a and serum calcium in the case of comparator plate 14b. Accordingly, it will be understood that the description of plate 14 will suffice for all three plates, except for the differences in scale markings, and it will also be understood that while the comparators are illustrated with reference to various constituents of blood, in view of the special utility of the present invention in connection with the analysis of blood or other body fluids, the invention is of course not limited to such analyses, but on the contrary, is of more general application.

Referring now more particularly to the comparator plate 14, said plate is translucent so that when it is placed on the surface of the chart 10, the recording or trace 12, made on the chart paper by the stylus of the recorder, is visible through the comparator plate, as clearly illustrated in FIG. 1. The comparator plate is preferably formed of sheet plastic such as vinylite, for example, but without limitation, and comprises the layers 18 and 20 which are in laminated relation, being adhesively united with each other throughout their contiguous surfaces. The outer surface of back layer 18 is smooth, while the outer surface of front layer 20 is a matte surface to accept pencil and/or ink markings. The inner surface of one of the layers here shown as the back layer 18 is provided with the scale markings which, in the case of the plate 14, are constituted by spaced lines arranged in a curvature corresponding, in general outline, to the calibration curve for the urea nitrogen analysis, said scale being visible through the layer 20 at the front of the comparator plate. The scale markings are in concentration units, for example, mg. percent (miligrams percent). It will be observed that the lines of the scale markings ("0" to "150," in the case of FIG. 6) do not extend for the full height of the plate, but on the contrary, are shortened and, as previously stated, are arranged in a curvature corresponding to the general type of curvature of a calibration curve for the substance with which this particular plate is to be used, in this case urea nitrogen, as previously stated. This arrangement of the scale markings has been found to be advantageous because it reduces the possibility of confusion on the part of the user of this instrument which might result from scale delineations on the entire front surface of the comparator and is of value in aiding the user to draw the calibration curve 16 on the front surface of the comparator plate. In FIG. 9, the "0" and "10" scale markings are designated by the numerals 22 and 24 for the sake of clarity of illustration.

In order to facilitate the use of the comparator in connection with the recording for ascertaining the concentration values, there is provided a desk-like device 28 adapted to be placed on the top of a table or desk and provided with an inclined support 30 for the chart 10 and the comparator plate 14. As illustrated, the support 30 is preferably in the form of a cover for the desk housing 32 and is pivoted to the rear top edge of the latter as indicated at 34. The front edge portion of support 30 is provided with a positioning device 36 which includes the inner and outer strips 38 and 40, respectively, secured to support 30 in any suitable way as by a plurality of screws 42. The upper edge of strip 40 extends beyond the upper edge of strip 38 so as to provide a recess 44 to receive the lower marginal edges of chart 10 and plate 14 as illustrated in FIG. 5. The upper surface of support 30 is preferably rough to constitute a friction surface which prevents unintentional slippage between the upper surface of said support and the chart paper 10 during the movement of comparator plate 14 longitudinally on said chart paper in the use of the device of the present invention in the manner which will now be described.

The manner of utilizing the present invention will first be described with reference to the provision of the calibration curve on the comparator plate 14 to provide the comparator for use in determining concentrations in mg. percent of substances of unknown concentrations in a series of liquid samples or specimens in the normal operation of the colorimeter-recorder. As illustrated in FIG. 1, the chart 10 provided with the recording 12 derived by running a series of liquids of known concentrations through the colorimeter for controlling the operation of the recorder is placed on the support 30, and the comparator plate 14 is placed in position on the front surface of the chart 10. It will be noted that the calibration recording 12 is constituted by a plurality of curves formed in succession corresponding to known samples of concentrations of "10," "30," "50," "70," "100," and "150" expressed in mg. percent, said concentration values being indicated in FIG. 1 on chart 10 in juxtaposition to the zero slope points, respectively, of the left hand part of recording 12, said zero slope points being the points of maximum concentration in each sample as it is run through the colorimeter. In this connection, it will be understood that as each sample is run through the colorimeter, whether known or unknown, in conjunction with the processing liquid, as described for example in the United States patent to Leonard T. Skeggs, No. 2,797,149, the color concentration of the liquid passing through the flow cell of the colorimeter varies from a minimum to a maximum, and this takes place in succession with each sample in the stream of samples transmitted through the colorimeter. The calibration recording 12, selected for illustration, includes also the tracings of a plurality of samples of the same known concentrations as those of the samples whose concentrations are indicated at the left of recording 12 from "0" mg. percent to "150" mg. percent, respectively, but the right hand part of the recording 12 was derived by inverting the order of the succeeding samples of the same known concentrations so that the right hand part of the recording 12 is made up of samples of known concentrations which were progressively lower in their order of transmission through the colorimeter.

The calibration curve 16 is obtained by marking dots on the scale lines "10" to "150," respectively, on the comparator plate 14, as illustrated in FIG. 1, which shows the dots or points on the scale lines "10" to "150" corresponding to the samples of these known concentrations, respectively. As illustrated in FIG. 1, the projection of the known concentration values from the recording 12 on the chart 10 to the scale lines are illustrated by the horizontal dot and dash lines extending from the calibration recording 12 to said scale lines, but these horizontal lines of projection need not be actually marked on the surface of the comparator plate. On the contrary, plate 14 may be slid along the surface of paper 10 so as to align the scale markings on the comparator plate with the corresponding concentration values of the calibration recording 12. The points thus obtained on the scale lines of the comparator plate 14 are then connected by a smooth line to form the curve 16 illustrated in FIG. 2.

Figure 3:
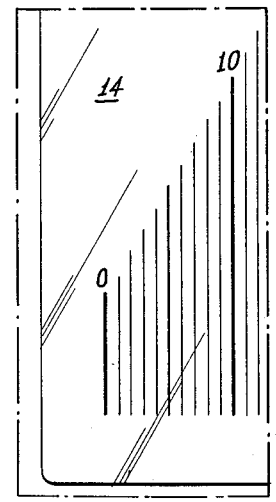
FIG. 3 is an enlarged plan view of a part of the comparator within the dotted outline indicated by the numeral 3 in FIG. 2.

After the comparator provided with the calibration curve 16 is obtained, it may be used for determining the concentration values of "unknowns." More specifically, when the sample liquids are to be analyzed with respect to concentrations of the same substance as that in the liquids from which the calibration recording 12 was derived, said sample liquids of unknown concentrations are run through the colorimeter and a recording on chart paper is obtained. The concentrations of these samples are then ascertained by placing the chart paper 10 containing said recordings on support 30 and the comparator 14 containing the calibration curve 16 is superimposed thereon and manipulated so as to read on the curve 16 the numerical value in mg. percent of the concentration of each sample liquid according to the recording on the chart 10. It will be understood that the point of zero slope for any particular sample might lie between any two adjacent scale markings illustrated on the comparator plate 14 in the form illustrated are spaced ten units apart according to FIG. 2, but as illustrated in FIG. 3, it will be observed that between the scale markings which are spaced from each other by ten units, there are ten sub-division lines, illustrated in FIG. 3 as between the "0" and "10" scale lines, so that sufficiently accurate readings may be obtained by direct observation of the comparator plate 14 in relation to each of the high points of the curves for the various samples, respectively.

Thus it is seen that the comparator provided for the chart reader in accordance with the present invention is well adapted to accomplish the objects and advantages of the invention. More specifically, it will be observed that one of the important advantages of the present invention is that it eliminates the need for transferring the values from the recording of the unknowns on the recording chart to semi-log paper and enables the values to be read directly from the recording on the chart, namely the chart 10 by relating the high point (the point at zero slope) of the curve for each unknown with the calibration curve 16 on the comparator and this can be readily accomplished by moving the comparator plate 14 until said point on the recording on chart 10 registers with a point on the calibration curve at one of the scale markings or sub-divisions thereof. This advantage of the present invention can be more fully appreciated by bearing in mind that the response of a colorimeter-recorder is nonlinear in percent transmission, so that in order to obtain a linear curve, it is necessary to plot percent transmission on semi-log paper to obtain the calibration curve for use for ascertaining percent transmission values in the case of unknown liquids and hence concentrations of samples under tests, and that the present invention eliminates the need for transferring the values from the recording on the recorder chart to semi-log paper and enables the values to be read directly from the recording on the recorder chart through the use of the comparator as described above.

In summary, in utilizing the comparator plate in accordance with the method of the present invention, a recording of light transmittance values of a series of standards, i.e., liquids of known concentrations of the same substance therein is obtained by transmitting said liquids seriatim in a flowing stream through the flow cell of a colorimeter, as described for example in my above mentioned Patent No. 2,797,149, and concurrently operating the companion recorder; a calibration curve based upon the light transmittance recording is then provided on the front surface of a comparator plate in the form of a logarithmic curve indicative of concentrations, respectively, of the substance in the different liquids, according to Beer's law; and the comparator thus provided with a calibration curve is thereafter utilized, as described above, for translating the light transmittance values of the recordings of unknown concentrations into concentration values.

It is to be noted that the matte surface on the comparator plate is similar to a ground-glass surface and that the calibration curve may be plotted and delineated on said surface readily by means of a soft lead pencil or other suitable writing implement, so that the calibration curve may be erased from said surface for replacement by another calibration curve, thus enabling the same comparator plate to be used repeatedly for providing calibration curves periodically during the operation of the colorimeter-recorder during a period of time in order to check on the accuracy of the operation of the recorder. For example, after the recorder has been in operation for a predetermined period of time for making recordings of sample liquids under tests, containing unknown concentrations, such operation of the recorder may be interrupted so that a series of standard liquids may be run for providing a calibration curve and this method of operation may be repeated at intervals during the day, according to the judgment or wishes of the technician.

The desk-like device 28 provides a compartment to hold comparator plates, pencils, erasers, etc. The hinged top 30 of said device on which the chart and the comparator plate are supported during the use of the comparator, has a non-slip white matte finish against which tracings on the chart are clearly visible, as the chart paper is ordinarily thin and somewhat translucent, and the tracings are comparatively opaque.

While I have shown and described the preferred embodiment of this invention it will be understood that various changes may be made therein without departing from the underlying idea or principles of this invention. Accordingly, I do not wish to be limited precisely to the invention as herein specifically shown or described, except to the extent which may be required by the scope of the appended claims.

Having thus described my invention, what I claim and desire to secure by Letters Patent is:

1. A comparator for use in conjunction with a recording made by a colorimeter-recorder of the light transmittance values of a substance in a series of liquid samples subjected to colorimetric examination for determining the concentration values of said substance represented by the corresponding light transmittance values of said recording, said comparator comprising a translucent plate provided with a linear scale of concentration values, said linear scale comprising a series of equally spaced parallel lines each representing a different concentration value which value differs by a constant amount from the concentration value represented by an adjacent line, said plate including a front surface having characteristics which permit a calibration curve to be readily delineated thereon by a writing implement, said calibration curve being based upon a light transmittance recording of the same colorimeter-recorder of a series of similar or equivalent liquids having known concentrations, respectively, of the same or a colorimetrically equivalent substance therein, and said lines of said scale being arranged to form a curved band of lines of the same general contour as that of the calibration curve to be provided on said front surface, said comparator plate being adapted to be moved over said first mentioned recording to position each of the light transmission values of the recording, visible through said translucent plate, at the corresponding concentration value on said curve to thereby determine the concentration value represented by said light transmittance value of said recording.

2. A comparator for use in conjunction with a recording made by a colorimeter-recorder of the light transmittance values of a substance in a series of liquid samples subjected to a colorimetric examination for determining the concentration values of said substance represented by the corresponding light transmittance values of said recording, said comparator comprising a translucent plate provided with a linear scale of concentration values, said linear scale comprising a series of equally spaced vertical lines each representing a different concentration value which value differs by a constant amount from the concentration value represented by an adjacent line, said plate including a front surface having a matte surface simulating a ground-glass surface which permits a calibration curve to be readily delineated thereon by a writing implement, said calibration curve being based upon a light transmittance recording of the same colorimeter-recorder of a series of similar or equivalent liquids having known concentrations, respectively, of the same or a colorimetrically equivalent substance therein, and said lines of said scale being arranged to form a curved band of lines of the same general contour as that of the calibration curve to be provided on said front surface, said comparator plate being adapted to be moved over said first mentioned recording to position each of the light transmission values of the recording, visible through said translucent plate, at the corresponding concentration value on said curve to thereby determine the concentration value represented by said light transmittance value of said recording.

3. A comparator for use in conjunction with a recording made by a colorimeter-recorder of the light transmittance values of a substance in a series of liquid samples subjected to colorimetric examination for determining the concentration values of said substance represented by the corresponding light transmittance values of said recording, said comparator comprising a translucent plate provided with a linear scale of concentration values, said linear scale comprising a series of equally spaced parallel lines each representing a different concentration value which value differs by a constant amount from the concentration value represented by an adjacent line, said plate including a front surface having characteristics which permit a calibration curve to be readily delineated thereon by a writing implement, said calibration curve being based upon a light transmittance recording of the same colorimeter-recorder of a series of similar or equivalent liquids having known concentrations, respectively, of the same or a colorimetrically equivalent substance therein, and said lines of said scale being arranged to form a curved band of lines of the same general contour as that of the calibration curve to be provided on said front surface, said plate comprising laminated front and back layers and said scale being delineated on one of the confronting surfaces of said layers interiorly of said plate, said comparator plate being adapted to be moved over said first mentioned recording to position each of the light transmission values of the recording, visible through said translucent plate, at the corresponding concentration value on said curve to thereby determine the concentration value represented by said light transmittance value of said recording.

4. A comparator for use in conjunction with a recording made by a colorimeter-recorder of the light transmittance values of a substance in a series of liquid samples subjected to colorimetric examination for determining the concentration values of said substance represented by the corresponding light transmittance values of said recording, said comparator comprising a translucent plate provided with a linear scale of concentration values, said linear scale comprising a series of equally spaced parallel lines each representing a different concentration value which value differs by a constant amount from the concentration value represented by an adjacent line, said plate including a front surface having a matte surface simulating a ground-glass surface which permits a calibration curve to be readily delineated thereon by a writing implement, said calibration curve being based upon a light transmittance recording of the same colorimeter-recorder of a series of similar or equivalent liquids having known concentrations, respectively, of the same or a colorimetrically equivalent substance therein, and said lines of said scale being arranged to form a curved band of lines of the same general contour as that of the calibration curve to be provided on said front surface, said plate comprising laminated front and back layers and said scale being delineated on one of the confronting surfaces of said layers interiorly of said plate, and the back surface of said back layer being smooth and thereby easily slidable on the surface of the recorder chart paper provided with said recording for positioning each line of said scale at the light transmittance value corresponding to the concentration value represented by said line.

5. The combination of a recorder chart provided with a recording on its surface made by a colorimeter-recorder of the light transmittance value corresponding to different concentration values of a substance in a series of liquid samples subjected to colorimetric examination and a comparator, said comparator comprising a translucent plate adapted to be superimposed on the surface of said chart for observing said recording, said plate being provided with a linear scale of concentration values comprising a series of equally spaced parallel lines each representing a different concentration value which value differs by a constant amount from the concentration value represented by an adjacent line, and a calibration curve extending across said lines of known concentration values corresponding to the light transmittance values of the same or a colorimetrically equivalent substance of known concentration in a series of similar or colorimetrically equivalent liquids, said plate having a smooth back surface so that the plate is easily slidable on the surface of said recorder chart to position each of the light transmittance values of the recording, visible through said translucent plate, at the corresponding concentration value on said curve to thereby determine the concentration value represented by said light transmittance value of said recording.

6. The method of translating light transmittance values of a recording representing unknown concentrations of a substance in a series of liquid samples subjected to colorimetric examination for determining the concentration values of said susbtance corresponding to said light transmittance values of said recording, said method comprising providing a comparator comprising a translucent plate having a linear scale of concentration values comprising a series of equally spaced parallel lines each representing a different concentration value which value differs by a constant amount from the concentration value represented by an adjacent line, delineating on said plate, in juxtaposition to said scale, a calibration curve of known concentration values corresponding to the light transmittance values of the same or a colorimetrically equivalent susbtance of known concentration in a series of similar or colorimetrically equivalent liquids, superimposing said plate over said recording of the light transmittance values representing said unknown concentrations, and sliding said plate over said recording to position each of the like transmission values of the recording, visible through said translucent plate, at the corresponding concentration value on said curve to thereby determine the concentration value represented by said light transmittance value of said recording.

References Cited in the file of this patent

UNITED STATES PATENTS

| | | |
|---|---|---|
| 946,265 | Park et al. | Jan. 11, 1910 |
| 1,979,964 | Duffendack et al. | Nov. 6, 1934 |
| 2,043,053 | Martin | June 2, 1936 |
| 2,244,826 | Cox | June 10, 1941 |
| 2,483,452 | Berkley | Oct. 4, 1949 |
| 2,577,815 | Saunderson et al. | Dec. 11, 1951 |
| 2,623,313 | Fuchs | Dec. 30, 1952 |
| 2,630,736 | Beitz | Mar. 10, 1953 |